(12) United States Patent
Grace et al.

(10) Patent No.: US 11,027,580 B2
(45) Date of Patent: Jun. 8, 2021

(54) WHEEL FOR AUTONOMOUS CLEANING ROBOT

(71) Applicant: iRobot Corporation, Bedford, MA (US)

(72) Inventors: Christopher Robin Grace, Windham, NH (US); Lindsay Louise Wright, Somerville, MA (US); Timothy James Haughton, Newton, MA (US); Marcus R. Williams, Watertown, MA (US); John Reimels, Scituate, MA (US); Timothy William Fleck, Woburn, MA (US)

(73) Assignee: iRobot Corporation, Bedford, MA (US)

( * ) Notice: Subject to any disclaimer, the term of this patent is extended or adjusted under 35 U.S.C. 154(b) by 161 days.

(21) Appl. No.: 16/239,018

(22) Filed: Jan. 3, 2019

(65) Prior Publication Data

US 2019/0210409 A1    Jul. 11, 2019

Related U.S. Application Data

(60) Provisional application No. 62/614,068, filed on Jan. 5, 2018.

(51) Int. Cl.
*B60C 11/03* (2006.01)
*B60C 7/10* (2006.01)
(Continued)

(52) U.S. Cl.
CPC ........... *B60C 11/0311* (2013.01); *A47L 11/28* (2013.01); *A47L 11/4036* (2013.01);
(Continued)

(58) Field of Classification Search
CPC ........ A47L 1/28; A47L 1/4072; A47L 1/4036; A47L 1/4063–4069;
(Continued)

(56) References Cited

U.S. PATENT DOCUMENTS 6,101,661 A * 8/2000 Policicchio ............. A47L 13/16
15/228
6,298,890 B1 * 10/2001 Binsfeld ............. B60C 11/0311
152/209.12
(Continued)

OTHER PUBLICATIONS

Yokohama, Off-The-Road Tires Lineup, 2017, pp. 6, 8-10, & 13-14) (Year: 2017).*

*Primary Examiner* — Michael E Barr
*Assistant Examiner* — Omair Chaudhri
(74) *Attorney, Agent, or Firm* — Schwegman Lundberg & Woessner, P.A.

(57) ABSTRACT

A wheel for an autonomous cleaning robot that maneuvers the robot on a floor surface includes a tire having first and second opposing outer edges and a middle portion having a tread pattern between the first and second outer edges, the tread pattern comprising a plurality of raised tread having trenches therebetween. Each of the plurality of raised tread includes a first raised tread portion extending from the first outer edge to the middle portion and substantially perpendicular to the first and second outer edges; a second raised tread portion extending at an angle away from the first raised tread portion; and a third raised tread portion extending from the second raised tread portion to the second outer edge and substantially perpendicular to the first and second outer edges, the third raised tread portion being laterally offset from the first raised tread portion.

20 Claims, 3 Drawing Sheets

(51) Int. Cl.
*A47L 11/40* (2006.01)
*A47L 11/28* (2006.01)
*B60C 7/24* (2006.01)
*B60C 7/00* (2006.01)
*B60C 11/00* (2006.01)

(52) U.S. Cl.
CPC ............ *A47L 11/4072* (2013.01); *B60C 7/10* (2013.01); *B60C 7/24* (2013.01); *A47L 2201/00* (2013.01); *B60C 2007/005* (2013.01); *B60C 2011/0016* (2013.01)

(58) Field of Classification Search
CPC . A47L 11/4036–4047; A47L 13/10–16; B60C 11/0311; B60C 11/0302; B60C 11/0316; B60C 11/032; B60C 11/045; B60C 11/03–0332; B60C 7/00–28; B60C 1/0016; B60C 2001/0091; B60C 19/001
See application file for complete search history.

(56) References Cited

U.S. PATENT DOCUMENTS

| | | | |
|---|---|---|---|
| 2007/0108716 A1* | 5/2007 | Scruggs | B60C 19/001 280/124.117 |
| 2009/0084478 A1* | 4/2009 | Wallet | B60C 3/04 152/209.13 |
| 2013/0026813 A1* | 1/2013 | MacPherson | B60C 7/08 301/31 |
| 2016/0270618 A1* | 9/2016 | Lu | A47L 11/4066 |
| 2016/0319113 A1* | 11/2016 | Tourenne | C08L 9/06 |
| 2019/0008344 A1* | 1/2019 | Kim | A47L 9/2826 |

* cited by examiner

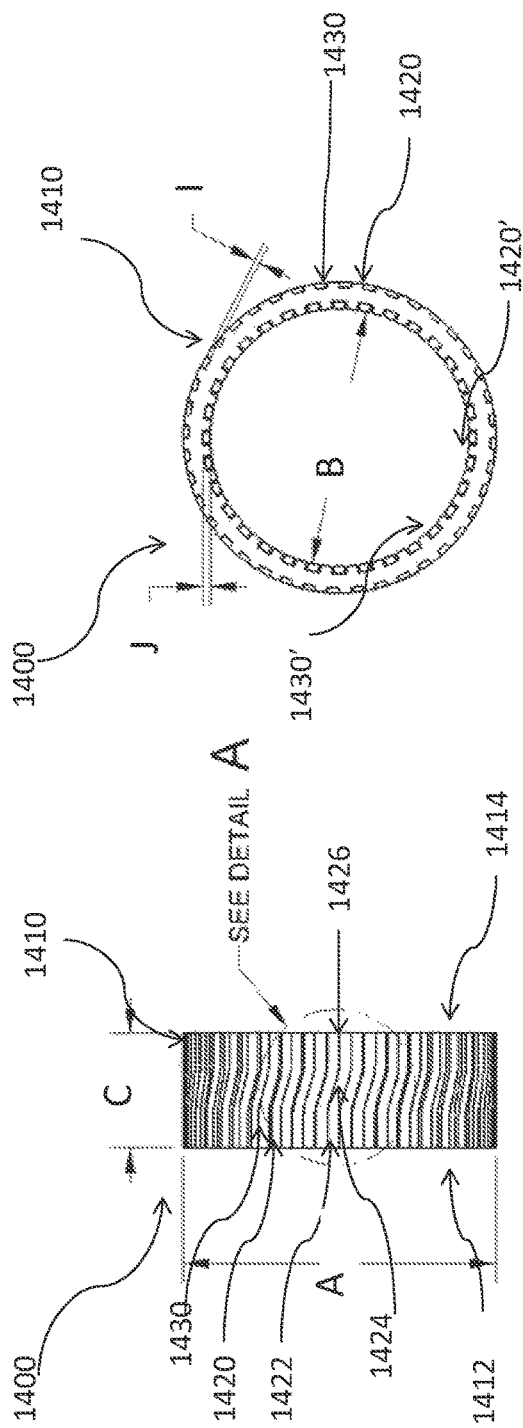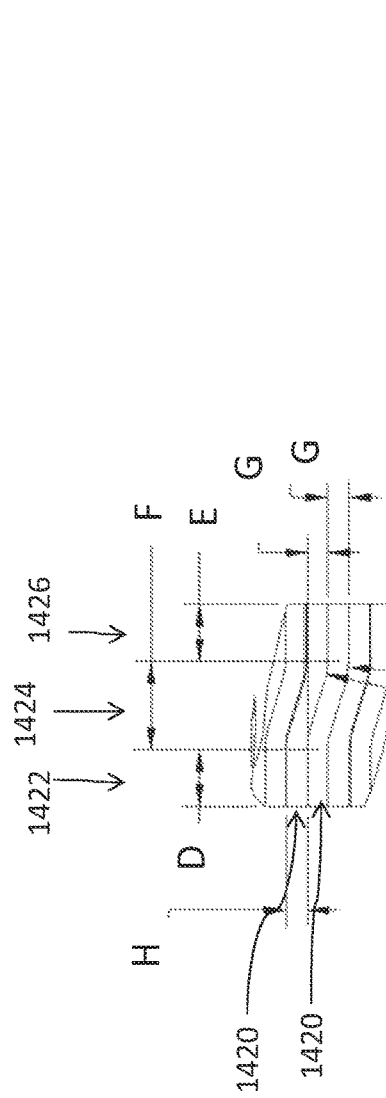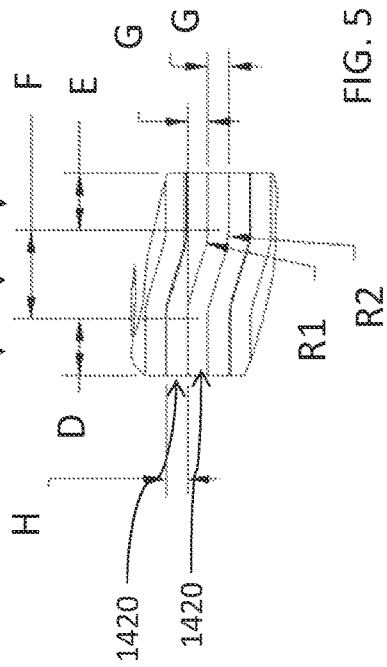

WHEEL FOR AUTONOMOUS CLEANING ROBOT

TECHNICAL FIELD

This specification relates to wheels, in particular, for cleaning robots.

BACKGROUND

An autonomous cleaning robot can navigate across a floor surface and avoid obstacles while mopping the floor surface to remove debris and stains from the floor surface. The cleaning robot can include a cleaning pad to mop the floor surface. As the cleaning robot moves across the floor surface, the cleaning pad wipes the floor surface and collects the debris. The cleaning pads mop the floor surface with a cleaning fluid or with water, which can cause a lack of traction for the robot wheels.

SUMMARY

This document describes a cleaning robot with a drive system with wheels on an underside thereof for maneuvering the robot over the floor surface. The wheels have a tread pattern that may reduce sliding and improve traction, in particular, on wet, smooth surfaces.

In some embodiments, a wheel for an autonomous cleaning robot that maneuvers the robot on a floor surface includes a tire having first and second opposing outer edges and a middle portion having a tread pattern between the first and second outer edges, the tread pattern comprising a plurality of raised tread having trenches therebetween. Each of the plurality of raised tread includes a first raised tread portion extending from the first outer edge to the middle portion and substantially perpendicular to the first and second outer edges; a second raised tread portion extending at an angle away from the first raised tread portion; and a third raised tread portion extending from the second raised tread portion to the second outer edge and substantially perpendicular to the first and second outer edges, the third raised tread portion being laterally offset from the first raised tread portion.

In some embodiments, the third raised tread portion is laterally offset from the first raised tread portion by a distance substantially equal to a width of one of the plurality of raised tread.

In some embodiments, a width of each of the plurality of raised tread is less than a width of the trenches between each of the plurality of raised tread.

In some embodiments, a length of the first raised tread portion is substantially equal to a length of the third raised tread portion.

In some embodiments, a length of the second raised tread portion is longer than the length of the first or third raised tread portion.

In some embodiments, the first, second and third raised tread portion form a continuous lug configured to have substantially continuous radial contact with the floor surface during use.

In some embodiments, the tire is formed of a material having a durometer range of between about 35 to about 60 Shore A.

In some embodiments, wherein the tire is formed of a polymeric material.

In some embodiments, the polymeric material comprises Nitrile Butadiene Rubber (NBR), Styrene Butadiene Rubber (SBR) or combinations thereof.

According to some embodiments, an autonomous cleaning robot includes a robot body comprising a forward portion and an aft portion; a cleaning assembly on the robot body; and a drive system to maneuver the robot body across a floor surface. The drive system includes a wheel that maneuvers the robot on a floor surface. The wheel includes a tire having first and second opposing outer edges and a middle portion having a tread pattern between the first and second outer edges, the tread pattern comprising a plurality of raised tread having trenches therebetween, each of the plurality of raised tread comprising: a first raised tread portion extending from the first outer edge to the middle portion and substantially perpendicular to the first and second outer edges; a second raised tread portion extending at an angle away from the first raised tread portion; and a third raised tread portion extending from the second raised tread portion to the second outer edge and substantially perpendicular to the first and second outer edges, the third raised tread portion being laterally offset from the first raised tread portion.

In some embodiments, the third raised tread portion is laterally offset from the first raised tread portion by a distance substantially equal to a width of one of the plurality of raised tread.

In some embodiments, a width of each of the plurality of raised tread is less than a width of the trenches between each of the plurality of raised tread.

In some embodiments, a length of the first raised tread portion is substantially equal to a length of the third raised tread portion.

In some embodiments, a length of the second raised tread portion is longer than the length of the first or third raised tread portion.

In some embodiments, the first, second and third raised tread portion form a continuous lug configured to have substantially continuous radial contact with the floor surface during use.

In some embodiments, the tire is formed of a material having a durometer range of between about 35 to about 60 Shore A.

In some embodiments, the tire is formed of a polymeric material.

In some embodiments, the polymeric material comprises Nitrile Butadiene Rubber (NBR), Styrene Butadiene Rubber (SBR) or combinations thereof.

In some embodiments, the cleaning assembly is affixed to the forward portion of the robot body, and the cleaning assembly includes a pad holder. A cleaning pad is affixed to the pad holder of the cleaning assembly.

In some embodiments, the cleaning pad comprises: a core of one or more absorbent layers for absorbing liquid through capillary action and for distributing the liquid within a cleaning pad; a wrap layer around the core, the wrap layer comprising a fibrous layer that is flexible and absorbent, the fibrous layer configured to absorb liquid through capillary action and transfer the liquid to the core; and one or more transition regions spanning a cleaning width of the cleaning pad, the transition regions dividing the cleaning pad into at least two segments, wherein a forward positioned segment, of the at least two segments, has a lesser thickness compared to a thickness of an aft positioned segment of the at least two segments.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 3 is a front view of the tire of FIG. 2.

FIG. 4 is a side view of the tire of FIG. 2.

FIG. 5 is an exploded view of the front tread surface of the tire of FIG. 2.

Like reference numbers and designations in the various drawings indicate like elements.

DETAILED DESCRIPTION

Figure 1:
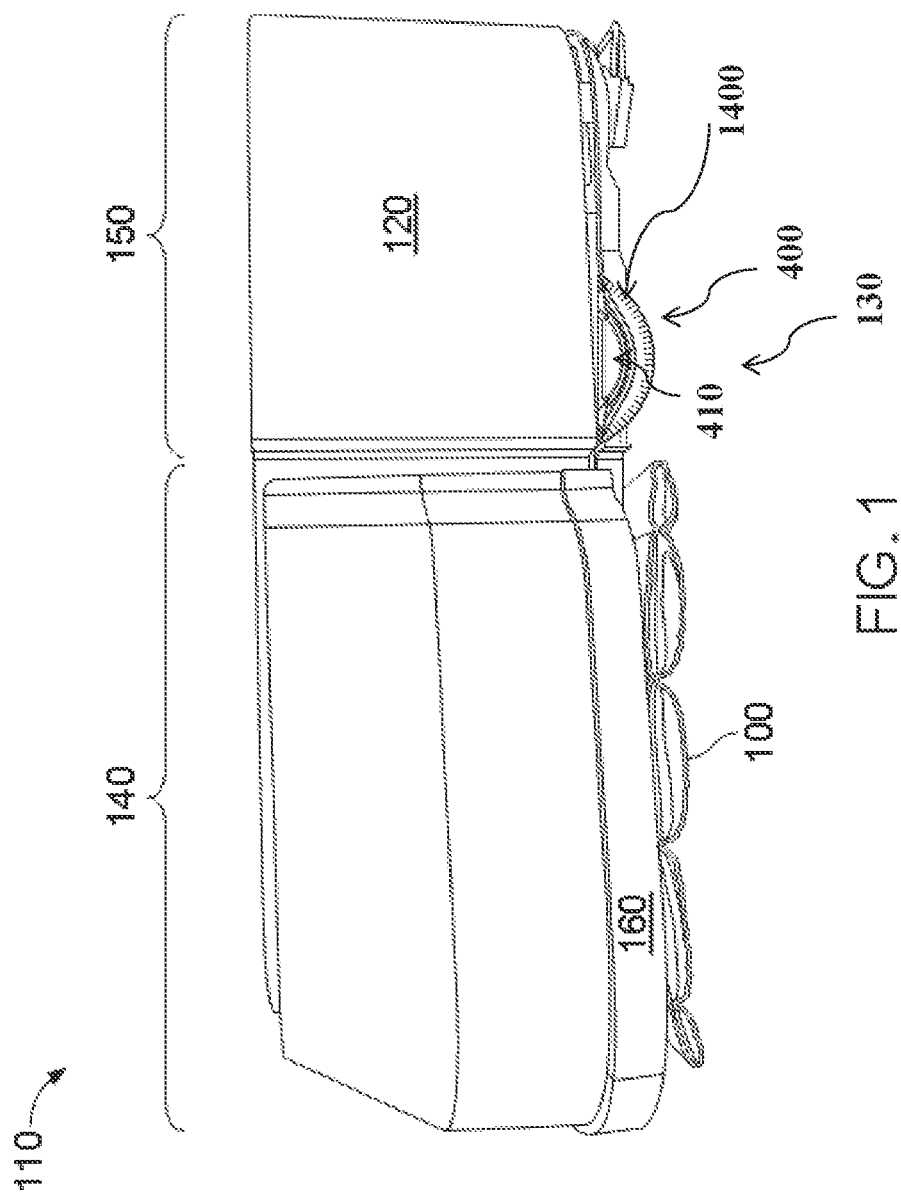
FIG. 1 is a side-view of an exemplary autonomous cleaning robot.

FIG. 1 shows a perspective view of a cleaning pad 100 attached to an autonomous cleaning robot 110. The autonomous cleaning robot 110 is configured to navigate a floor surface. The robot 110 is an autonomous mobile robot that weighs less than 10 lbs and navigates and cleans a floor surface. The robot 110 may include a body 120 supported by a drive system 130 that can maneuver the robot across the floor surface. In some implementations, the robot body 120 has a square shape. However, the body 120 may have other shapes, including but not limited to a circular shape, an oval shape, a tear drop shape, a rectangular shape, a combination of a square or rectangular front and a circular back, or a longitudinally asymmetrical combination of any of these shapes, etc. The robot body 120 has a forward portion 140 and a rearward portion 150. The body 120 also includes a bottom portion (not shown) and a top portion. The drive system 130 may include wheels 400 for supporting an maneuvering the robot 110. The wheels 400 include a tire 1400 that is mounted on a hub 410.

The bottom portion of the robot body 120 comprises one or more rear cliff sensors (not shown) in one or both of the two rear corners of the robot 110 and one or more forward cliff sensors located in one or both of the front corners of the robot. The cliff sensors can be mechanical drop sensors or light based proximity sensors, such as an IR (infrared) pair, a dual emitter-single receiver, or dual receiver-single emitter IR light-based proximity sensor aimed downward at a floor surface. The cliff sensors span between sidewalls of the robot 110 and cover the corners as closely as possible to detect flooring height changes beyond a threshold accommodated by reversible robot wheel drop prior to traversal of the respective floor portions by the robot. For example, the placement of the cliff sensors proximate the corners of the robot 110 ensures that the cliff sensors trigger when the robot 110 overhangs a flooring drop, preventing the robot wheels 400 from advancing over the drop edge.

The robot 110 carries a pad holder (not shown) on the forward portion 140 of the robot. The pad holder extends across the front edge of the robot 110 behind a bumper 160 and is configured to hold the pad 100.

The forward portion 140 of the body 120 carries a movable bumper 160 for detecting collisions in longitudinal or lateral directions. The bumper 160 has a shape complementing the robot body 120 and extends beyond the robot body 120 making the overall dimension of the forward portion 140 wider than the rearward portion 150 of the robot body. The bottom portion of the robot body 120 supports the cleaning pad 100. In embodiments, the pad 100 extends to the edges of the bumper 160 or beyond the width of the bumper 160 such that the robot 110 can position an outer edge of the pad 100 up to and along a wall surface or into a crevice. For example, the pad 100 can be maneuvered by the robot 110 to clean near a wall-floor interface by the extended edge of the pad 100 the while the robot 110 moves in a wall-following motion. Extending the pad 100 beyond the width of the bumper 160 enables the robot 110 to clean in cracks and crevices beyond the reach of the robot body 120. In some implementations, the pad 100 does not extend past the edges of the robot body 120.

The robot 110 can include a fluid applicator. The fluid applicator can have a single nozzle or multiple nozzles. The multiple nozzles are configured to spray the fluid in different directions from one another, different distances from the robot 110, or can be configured to spray in approximately the same direction. The fluid applicator applies fluid downward and outward, dripping or spraying fluid in front of the robot 110. Alternatively, the fluid applicator can be a microfiber cloth or strip.

The fluid applicator is a sprayer that includes at least two nozzles. Each of the nozzles distribute fluid evenly across the floor surface in two strips of applied fluid. The two nozzles are each configured to spray the fluid at an angle and distance different than another nozzle. The two nozzles are vertically stacked in a recess in the fluid applicator and angled from horizontal and spaced apart from one another such that one nozzle sprays relatively longer lengths of fluid forward and downward to cover an area in front of the robot 110 with a forward supply of applied fluid. The other nozzle sprays relatively shorter lengths fluid forward and downward to leave a rearward supply of applied fluid on an area in front of but closer to the robot 110 than the area of applied fluid dispensed by the top nozzle. The nozzle or nozzles dispense fluid in an area pattern that extends one robot width and at least one robot length in dimension. The top nozzle and bottom nozzle apply fluid in two distinct spaced apart strips of applied fluid that do not extend to the full width of the robot 110. The nozzles complete each spray cycle by sucking in a small volume of fluid at the opening of the nozzle so that no fluid leaks from the nozzle following each instance of spraying.

Cleaning pad assemblies and wet cleaning robots are described, for example, in U.S. Patent Publication No. 20180344117, the disclosure of which is hereby incorporated by reference herein in its entirety.

The robot 110 can include the drive system 130 with wheel 400 on an underside thereof for maneuvering the robot 110 over the floor surface. In some embodiments, the wheel 400 are positioned on opposing sides of the pad and include tires having a tread pattern. The wheels 400 may be mounted on the robot 110 in any suitable manner. Exemplary wheel mounting and drive assemblies are disclosed in U.S. Pat. No. 8,387,193, the disclosure of which is hereby incorporated by reference herein in its entirety.

Figure 2:
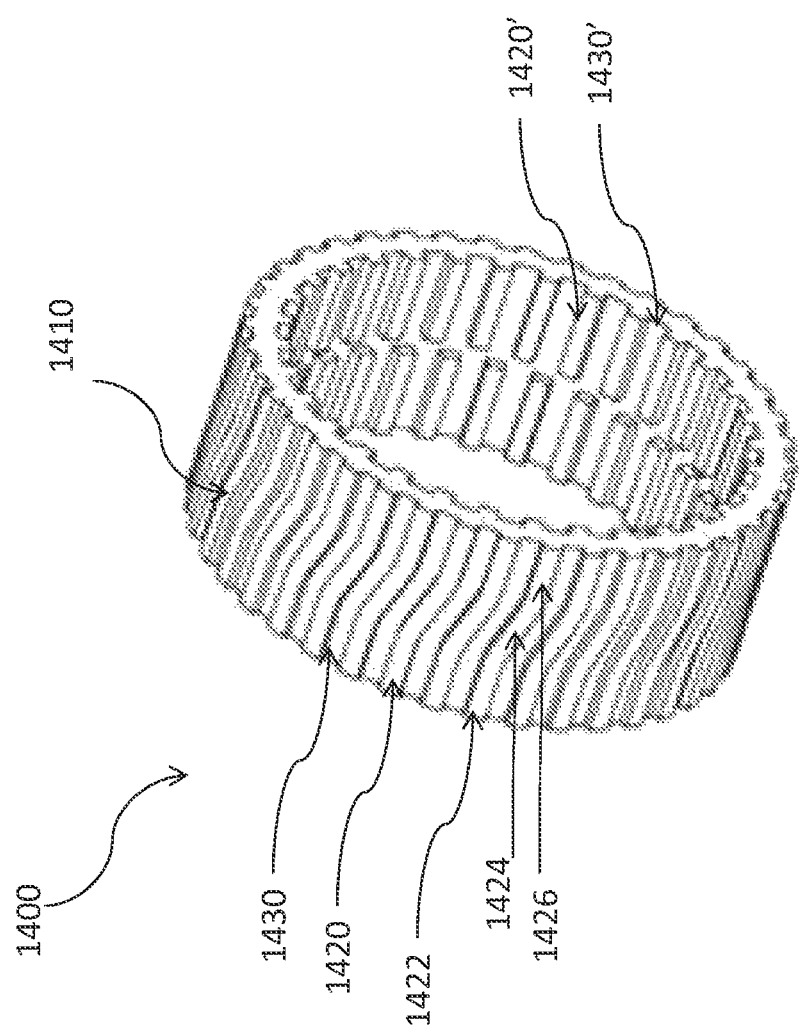
FIG. 2 is a perspective view of a tire for use with an autonomous cleaning robot according to some embodiments.

As shown in FIG. 2, a tire 1400 that is suitable for use with the drive system 130 of the robot 110 has an outer surface with a tread pattern 1410. As illustrated, the tread pattern 1410 includes raised treads 1420 and trenches 1430. The treads 1420 have a first tread portion 1422, second (middle) tread portion 1424, and a third tread portion 1426. As would be understood by one of skill in the art, the tire 1400 may be positioned on a hub (410, FIG. 1), such as an ABS plastic hub, and driven by a motor as part of the drive system of the robot 110.

As shown in FIG. 3, the tire 1400 includes two opposing outer edges 1412 and 1414 with a middle portion that has the tread pattern 1410 thereon. With reference to FIGS. 2, 3 and 5, the first raised tread portion 1422 of the treads 1420 extends from one of the outer edges 1412 to the middle portion of the tire substantially perpendicular to the outer edges 1412, 1414. The second raised tread portion 1424 extends at an angle away from the first raised tread portion 1422. Although the second raised tread portion 1424 is illustrated as extending at an angle downward from the first raised tread portion 1422, it should be understood that the second raised tread portion 1424 may alternatively extend at a corresponding upward angle. The third raised tread portion 1426 extends to the other outer edge 1414 and is substantially perpendicular to the outer edges 1412, 1414.

As illustrated, the third raised tread portion 1426 is laterally offset from the first raised tread portion 1422. In some embodiments and as illustrated, the offset is a distance substantially equal to a width of one of the raised treads 1420 such that the bottom edge of the first raised tread portion 1422 aligns with the top edge of the third raised tread portion 1426; however, the offset distance may vary, such as from less than 0.5, 0.6, 0.7, 0.8, 0.9 times the width of the tread portions 1422, 1424, 1426 to 1.1, 1.2, 1.3, 1.4, 1.5, 1.6, 1.7, 1.8 times or greater than a width of the tread portions 1422, 1424, 1426. A length of the first raised tread portion 1422 may be substantially equal to a length of the third raised tread portion 1426, and the second raised tread portion 1424 may be longer than the length of the first or third raised tread portion. In some embodiments, the second (middle) raised tread portion 1424 is about 50% longer than the length of the first or third raised tread portion, although other proportions (20, 30, 40, 50% to 60, 70, or 80% longer) are contemplated. In some embodiments, the intersection between the first and second tread portions 1422, 1424 and the intersection between the second and third tread portions 1424, 1426 may form a rounded corner. As shown in FIGS. 2 and 4, the tire 1400 can include an interior surface with raised features 1420 and trenches 1430 for interacting with or gripping a hub.

Exemplary dimensions of the tire according to some embodiments are described below with respect to FIGS. 2-5. Although exemplary dimensions (in millimeter) of the tire according to some embodiments are illustrated in FIGS. 2-5, it should be understood that any suitable dimensions may be used. The curvature of the rounded corners R1, R2 between the first and second tread portion 1422, 1424 and the second and third tread portion 1424, 1426 may be curvatures equivalent to a circle with a radius range of about 3.0 to about 8.0 mm (see FIG. 5). The outer diameter A of the tire may range from about 10, 15, 20, 25, 30 mm to about 35, 40, 45, 50, 50, or 60 mm, and the inner diameter B may be about 2, 3, 4 or 5 mm less than the outer diameter, such as a range from about 7 mm to 58 mm, or a range of about 5, 10, 15, 20, 25 mm to about 30, 35, 40, 45, 50, 55 or 60 mm. The width C of the tire may range from about 5, 10, 15, 20 mm to about 25, 30, 35, or 40 mm, and the length D of the first portion of the tread and the length E of the third portion of the tread 1422, 1426 may range from about 2, 3, 4, 5, 6, 7, 8 mm to about 9, 10, 11, 12, 13, 14 or 15 mm, and the length F of the second portion of the tread 1424 may range from about 2, 3, 4, 5, 6, 7, 8, 9, 10, 15, 20 mm to about 25, 30, or 35 mm. The width G of the raised tread 1420 may range from about 1, 2, 3 mm to about 4 or 5 mm, and the width H of the trenches 1430 may range from about 1, 2, 3 mm to about 4 or 5 mm. The depth of the trenches 1430 or height of the tread 1420 may range from about 0.2, 0.5, 0.7, 0.9, 1.0 mm to about 2, 3, 4, or 5 mm. The interior surface of the tire includes raised features, such as raised portions 1420' and trenches 1430'. The raised portions 1420' may have a height that may range from about 0.3, 0.5, 0.7, 0.9, 1.0, 1.5, 2.0, 2.5 mm to about 3.0, 3.5, 4.0, 4.5, or 5.0 mm. In particular embodiments, the curvature of the rounded corners R1, R2 between the first and second tread portion 1422, 1424 and the second and third tread portion 1424, 1426 are provided as curvatures equivalent to a circle of radius 4.5 mm at the top of the tread (R1) and of radius 6.0 at the bottom of the tread (R2) (see FIG. 5). The outer diameter A of the tire is 40.75 mm, and the inner diameter B is 33.80 mm. The width of the tire C is 15.00 mm, and the length D of the first portion of the tread 1422 and the length E of the third portion of the tread 1426 are 4.22 mm and the length F of the second portion of the tread 1424 is 6.56 mm. The width G of the raised tread 1420 is 1.517 mm, and the width H of the trenches 1430 is 1.57 mm. The depth I of the trenches 1430 (or height of the tread 1420) is 0.65 mm. The interior surface of the tire includes raised features 1420' having a height J (or depth of the trenches 1430') of 0.98 mm.

In this configuration, the tread 1410 generally forms an "S" pattern that allows for a generally unbroken raised tread or lug and substantially continuous radial contact with the floor surface during use. This continuous contact with the floor surface may result in a smoother and more quiet transport across the floor surface because the load does not abruptly transition from one lug to the next, but rather has substantially continuous radial contact with the tread 1410. The full width tread 1410 may further create a larger contact patch with improved traction, reducing wear of the tread. In some embodiments, softer materials may be used to increase traction and further enlarge the contract patch. Moreover, the leading edge of the first portion of the tread 1422 may provide a greater aggregate friction, particularly when traveling through water-surfactant. The "S" shape of the tread may also provide ease of manufacture as it can be molded side to side.

In some embodiments, the tire is formed from an elastomeric material, such as Nitrile Butadiene Ruber (NBR) having a 40 Shore A durometer. However, materials having a durometer range between about 35 to about 60 Shore A may be used. Other suitable materials include Styrene Butadiene Rubber (SBR) or SBR/NBR blends.

Several implementations have been described above. Accordingly, other implementations are within the scope of the claims.

The present invention is described herein with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and fully convey the scope of the invention to those skilled in the art. Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

The foregoing is illustrative of the present invention and is not to be construed as limiting thereof. Although a few example embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A wheel for an autonomous cleaning robot that maneuvers the robot on a floor surface, the wheel comprising:
   a tire having a circular shape, having first and second opposing outer edges and a middle portion having a tread pattern between the first and second outer edges and including an interior surface having raised features and hub trenches configured to engage a hub, the tread pattern comprising a plurality of raised treads having trenches therebetween, each of the plurality of raised treads comprising:
   a first raised tread portion extending from the first outer edge to the middle portion and perpendicular to the first and second outer edges;
   a second raised tread portion extending at an angle away from the first raised tread portion; and
   a third raised tread portion extending from the second raised tread portion to the second outer edge and perpendicular to the first and second outer edges, the third raised tread portion being laterally offset from the first raised tread portion.

2. The wheel of claim 1, wherein the third raised tread portion is laterally offset from the first raised tread portion by a distance equal to a width of one of the plurality of raised tread.

3. The wheel of claim 1, wherein a width of each of the plurality of raised tread is less than a width of the trenches between each of the plurality of raised tread.

4. The wheel of claim 1, wherein a length of the first raised tread portion is equal to a length of the third raised tread portion.

5. The wheel of claim 4, wherein a length of the second raised tread portion is longer than the length of the first or third raised tread portion.

6. The wheel of claim 1, wherein the first, second and third raised tread portion form a continuous lug configured to have continuous radial contact with the floor surface during use.

7. The wheel of claim 1, wherein the tire is formed of a material having a durometer range of between about 35 to about 60 Shore A.

8. The wheel of claim 1, wherein the tire is formed of a polymeric material.

9. The wheel of claim 8, wherein the polymeric material comprises Nitrile Butadiene Rubber (NBR), Styrene Butadiene Rubber (SBR) or combinations thereof.

10. An autonomous cleaning robot, comprising:
    a robot body comprising a forward portion and an aft portion;
    a cleaning assembly on the robot body;
    a drive system to maneuver the robot body across a floor surface, the drive system comprising:
    a hub; and
    a wheel mounted on the hub, the wheel configured to maneuver the robot on a floor surface, the wheel comprising:

a tire having a circular shape, having first and second opposing outer edges and a middle portion including an interior surface having raised features and trenches configured to engage the wheel, and the middle portion having a tread pattern between the first and second outer edges, the tread pattern comprising a plurality of raised treads having trenches therebetween, each of the plurality of raised treads comprising:
  a first raised tread portion extending from the first outer edge to the middle portion and perpendicular to the first and second outer edges;
  a second raised tread portion extending at an angle away from the first raised tread portion; and
  a third raised tread portion extending from the second raised tread portion to the second outer edge and perpendicular to the first and second outer edges, the third raised tread portion being laterally offset from the first raised tread portion.

11. The robot of claim 10, wherein the third raised tread portion is laterally offset from the first raised tread portion by a distance equal to a width of one of the plurality of raised tread.

12. The robot of claim 10, wherein a width of each of the plurality of raised tread is less than a width of the trenches between each of the plurality of raised tread.

13. The robot of claim 10, wherein a length of the first raised tread portion is equal to a length of the third raised tread portion.

14. The robot of claim 13, wherein a length of the second raised tread portion is longer than the length of the first or third raised tread portion.

15. The robot of claim 10, wherein the first, second and third raised tread portion form a continuous lug configured to have continuous radial contact with the floor surface during use.

16. The robot of claim 10, wherein the tire is formed of a material having a duronieter range of between about 35 to about 60 Shore A.

17. The robot of claim 10, wherein the tire is formed of a polymeric al.

18. The robot of claim 17, wherein the polymeric material comprises Nitrile Butadiene Rubber (NBR), Styrene Butadiene Rubber (SBR) or combinations thereof.

19. The robot of claim 10, wherein the cleaning assembly is affixed to the forward portion of the robot body, the cleaning assembly comprising a pad holder; and
  a cleaning pad affixed to the pad holder of the cleaning assembly.

20. The robot of claim 19, wherein the cleaning pad comprises:
  a core of one or more absorbent layers for absorbing liquid through capillary action and for distributing the liquid within a cleaning pad;
  a wrap layer around the core, the wrap layer comprising a fibrous layer that is flexible and absorbent, the fibrous layer configured to absorb liquid through capillary action and transfer the liquid to the core; and
  one or more transition regions spanning a cleaning width of the cleaning pad, the transition regions dividing the cleaning pad into at least two segments,
  wherein a forward positioned segment, of the at least two segments, has a lesser thickness compared to a thickness of an aft positioned segment of the at least two segments.

* * * * *

UNITED STATES PATENT AND TRADEMARK OFFICE
CERTIFICATE OF CORRECTION

PATENT NO. : 11,027,580 B2
APPLICATION NO. : 16/239018
DATED : June 8, 2021
INVENTOR(S) : Grace et al.

Page 1 of 1

It is certified that error appears in the above-identified patent and that said Letters Patent is hereby corrected as shown below:

In the Claims

Column 10, Line 6, Claim 16, delete "duronieter" and insert --durometer-- therefor Column 10, Line 9, Claim 17, delete "al." and insert --material.-- therefor Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*